Jan. 14, 1941.    L. O. BIRD    2,228,865
GROUND WORKING APPARATUS
Filed May 31, 1939    2 Sheets-Sheet 1

INVENTOR.

Jan. 14, 1941.　　　　L. O. BIRD　　　　2,228,865
GROUND WORKING APPARATUS
Filed May 31, 1939　　　2 Sheets-Sheet 2
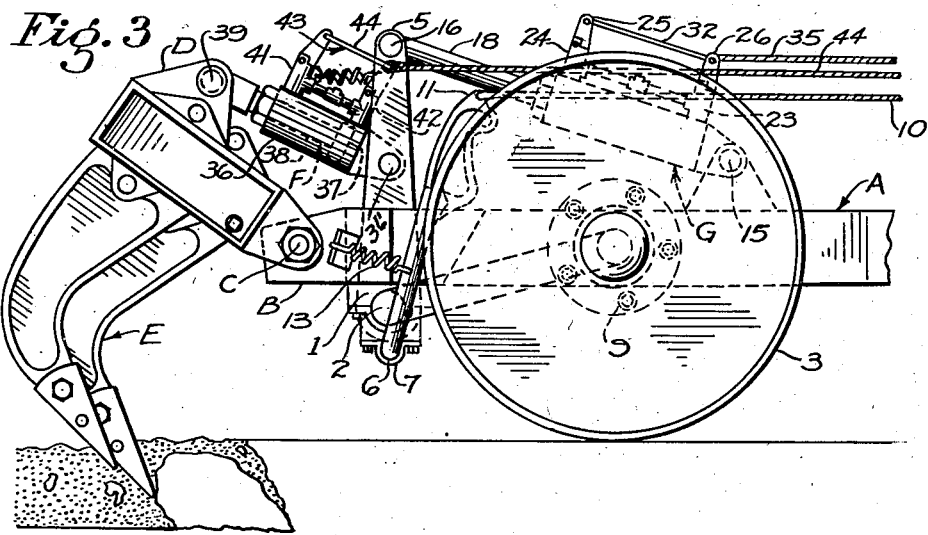
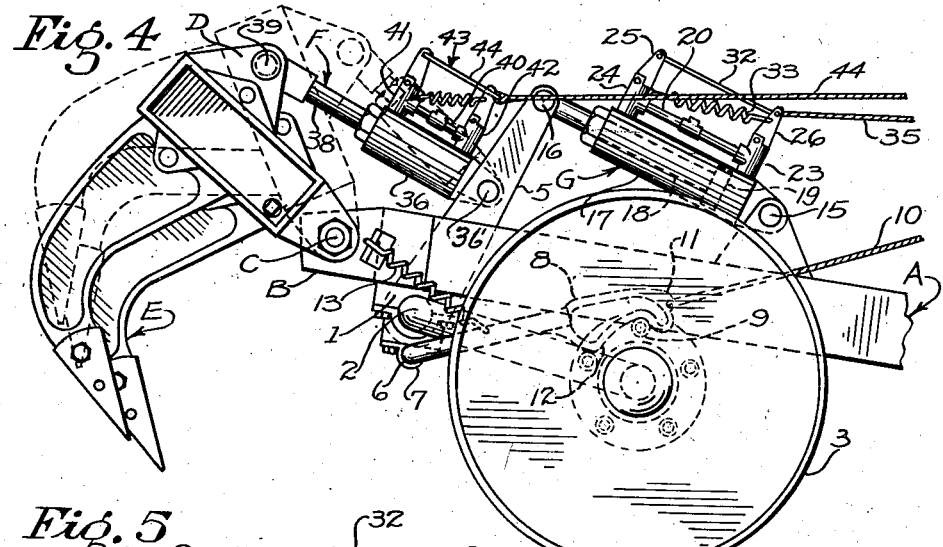
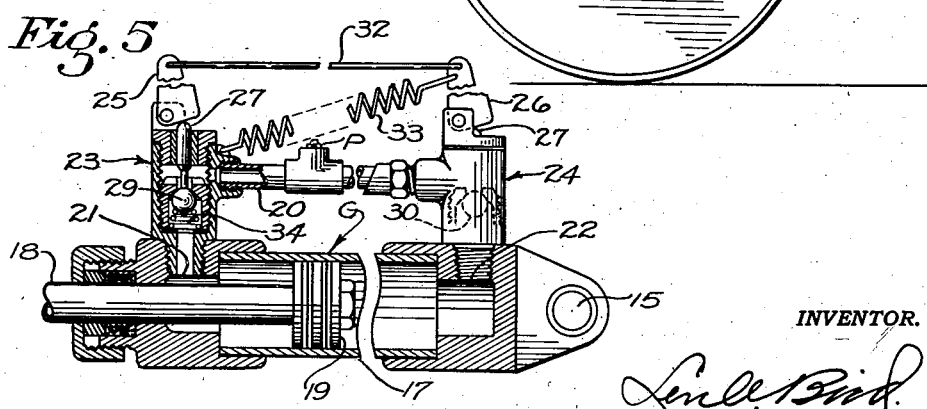
INVENTOR.

Patented Jan. 14, 1941

2,228,865

UNITED STATES PATENT OFFICE 2,228,865

GROUND WORKING APPARATUS

Len O. Bird, Glendale, Calif.

Application May 31, 1939, Serial No. 276,531

16 Claims. (Cl. 97—73)

The present invention relates to tractor operated ground working or rooting apparatus and has for a purpose the provision of certain improvements as to the construction and operation of such apparatus, for more effectively controlling the movement and positioning of the toothed or other ground working implement thereof, from the tractor, so as to vary the depth of penetration of said implement at will over a wide range, control the entire downward movement of said implement for preventing the same from striking hard ground with such force as might damage it and also setting the implement at the desired position, and to quickly release the implement from roots, boulders, or obstructions without requiring the stopping and backing up of the apparatus.

Another purpose of my invention is to provide a novel hydraulic means for controlling the movement of the rooting implement in such a manner that it may be set for operation or held in any position between its uppermost and lowermost positions and with all movement and adjustments under full control from the tractor and capable of being carried out without necessitating the stopping or backing up of the apparatus.

A further purpose of my invention is to provide a hydraulic means selectively operable as a link and lost motion device for controlling the movement of the implement whereby it may be moved independently of or simultaneously with an associated mechanism for bodily raising and lowering the implement. This selective operation provides release of the teeth when hooked under or engaged with obstructions, also for holding the implement in various elevated positions for affording clearance of or the engagement with and the pulling up or moving of stumps, boulders, etc., said hydraulic means also making it possible to change the angle of the teeth of the implement without lowering or moving said associated mechanism or the entire frame of the apparatus.

With the foregoing and other objects in view, the invention hereof consists in the combination, correlation and construction of parts, elements and features which will be described in the following specifications and finally pointed out in the claims hereto appended, it being understood that the apparatus of my invention is subject to modification within the scope of said claims.

In the drawings:

Fig. 3 is a fragmentary side elevation partly in section showing the implement as when partly raised independently of raising the main frame.

Fig. 4 is a fragmentary side elevation showing in full lines the implement and frame in the position of approximate maximum elevation when raised from position shown in Fig. 2 and showing in dotted lines the higher position of the implement as when raised from the position thereof shown in Fig. 3.

Fig. 5 is an enlarged longitudinal section showing in detail the construction and arrangement which is common in the two hydraulic devices employed in the apparatus.

Figure 1:
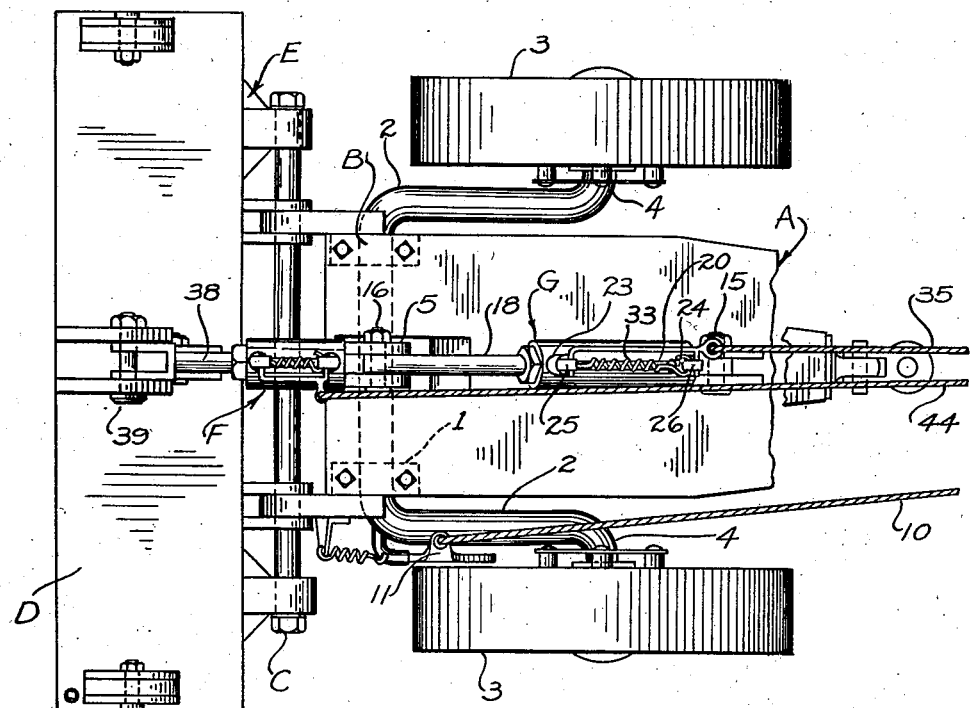
Fig. 1 is a top plan view of apparatus constructed in accordance with my invention.

One form of ground working or rooter apparatus embodying my invention generally comprises as shown in the accompanying drawings a vertically adjustable and articulate frame A having a main section B to which is hinged as at C a section D for supporting and positioning a toothed or other implement E. Movement of the implement E into and out of operative position is effected by vertically adjusting the frame sections B and D bodily and also by moving the implement carrying section D on its hinge C either with or independently of the vertical movement of section B.

As here shown the main section B of frame A is provided with bearings 1 in which is journalled a crank-axle 2 having wheels 3 rotatably mounted on the free ends 4 thereof. When the crank-axle 2 is turned in the bearings 1, the section B and the section D hinged thereto will be vertically adjusted. During this adjustment of the sections B and D a lever or crank arm 5 welded or otherwise fixed at one end to the crank-axle 2 will be rocked and through a hydraulic link device F pivoted thereto and to the frame D, will move the section D on its hinge C.

Figure 2:
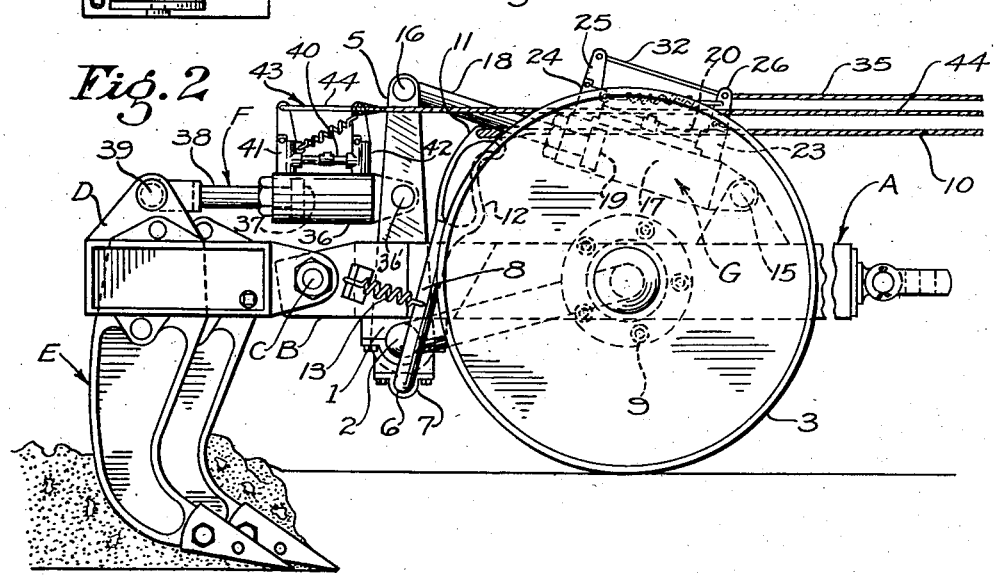
Fig. 2 is a side elevation of the apparatus as when the implement is in rooting position.

The crank axle 2 as here shown is arranged to be turned in its bearings 1 whereby to raise the frame A, by means of a wheel operated mechanism which includes a shaft 6 rotatably supported in bearings 7 fixed to bearings 1, and hook arms 8 fixed to the ends of said shaft and operable for engaging drive pins 9 arranged in circular series around the hubs of the wheels 3. A cable 10 extending from the tractor (not shown) and connected with an ear 11 on one of the arms 8 provides for disposing the arms 8 in a position for engaging certain pins 9 on the wheels 3. When the arms 8 are thus engaged with certain pins 9, the pull on said arms caused by the turning of the wheels 3 during advance of the rooter, will raise the crank axle from its normal position shown in Fig. 2 to the position shown in Fig. 4 whereby to fully lift the frame A and implement E. The hook arms 8 are cammed out of pin engaging position by certain of the pins 9 encountering cam projections 12 on said arms as shown in Fig. 2. A spring 13 connected with the frame section B and one of the arms 8 operates to normally hold said arms clear of the pins 9 and since said arms are moved into and held in engagement with pins 9 against the action of said spring, they will be moved clear of said pins and so held when disengaged therefrom as aforesaid.

In accordance with this invention I provide a hydraulic control device G similar to the link F for controlling the downward or return movement of the frame A, crank axle 2, and implement E, to prevent the implement from striking the ground too forcibly as would be the case if it could freely gravitate into ground engaging position. Due to the great weight of the implement and associated parts as necessary to provide an effective rooting and ground ripping operations, it is seen that such parts tend to forcibly and rapidly gravitate when released and the blades are apt to break or become damaged in striking the ground. Accordingly the hydraulic device G is pivoted at one end as at 15 to the frame section B and at its other end as at 16 to the upper end of the crank arm on lever 5 and acts as a dash-pot or checking means to control the gravitational lowering of the implement E. Moreover the device G is operable for regulating the depth of penetration of teeth of the implement.

As shown in Fig. 5 the hydraulic device G includes a cylinder 17 closed at both ends and pivoted at one end as at 15 with the frame section B. A piston rod 18 pivoted at 16 to the lever 5 extends through the other end of this cylinder and is connected with a piston 19 arranged to reciprocate in the cylinder. A by-pass 20 is connected with small ports 21 and 22 adjacent the ends of the cylinder and valves 23 and 24 control said ports. The cylinder and by-pass are filled with oil and the passage of said oil through said by-pass is controlled by said valves. Levers 25 and 26 are connected to said valves for reciprocating plunger 27 pivoted thereto and arranged to move inwardly to position for unseating ball valves 29 and 30. The levers 25 and 26 are connected for joint operation by means of a link 32 and are normally held by a spring 33 in position to maintain the plungers 27 and 28 retracted, whereby springs 34 will normally function to seat the valves 29 and 30. A cable 35 is connected with the forward end of the link and leads to the tractor for actuation by the tractor operator to control the operation of the device G.

The hydraulic link F is substantially identical with the device G in that it has an oil filled cylinder 36 pivoted at 36' to the lever 5, a piston 37 therein, a piston rod 38 pivoted at 39 to the implement carrying section D, a by-pass 40, valves 41 and 42 controlling said by-pass, and operating mechanism 43 including a cable 44 leading to the tractor, in the same manner as cable 35, there also being a spring 45 for normally holding the mechanism 43 in position to allow the valves 41 and 42 to remain closed. It is now seen that when the valves 41 and 42 are closed the cylinder and piston rod are held by the oil in the cylinder against relative movement and the device F functions as a rigid link but when said valves are opened the cylinder 36 and piston rod 38 are free to move relatively and act as a lost-motion connection affording movement of the implement carrying section D on its hinge C independent of movement of the lever 5.

Operation

When the implement is in rooting position as shown in Fig. 2 it may be lifted by two different methods of operation of the mechanism hereof. One lifting method requires the pulling on the cable 11 so as to move the hook arms 8 into engagement with pins 9 on the wheels 3 and also requires the pulling on cable 35 whereby to open the valves 23 and 24 of the hydraulic device G. When the arms 8 engage with pins 9, the wheels 3 in turning, pull on said arms and thereby raise the crank axle 2 from position shown in Fig. 2 to position shown in Fig. 4 whereby to bodily lift the frame A and implement E. The lifting of the axle and frame ceases when the pins 9 which are next rearward of the ones that are engaged with the hook arms 8, are moved to position for engaging the cam portions 12 on said arms, at which time said arms are disengaged from the pins to which they are hooked. The spring 13 then moves said arms clear of said pins and so maintains said arms. During the raising or turning of the crank axle 2 the lever or crank arm 5 fixed thereto is swung forwardly from position shown in Fig. 2 to position shown in Fig. 4 and in so moving forces the piston 19 forwardly in the cylinder 17 of the hydraulic device G. The piston moves freely at this time due to the fact that the operation through the cable 35 maintains the valves 23 and 24 open to allow for a free circulation of the oil through the by-pass 20, it being noted that said valves are held open during this raising operation. When the crank arm 5 moves forwardly it acts through the link F which then serves as an ordinary link due to its valves 41 and 42 being closed, to swing the frame section D upwardly on the hinge C whereby to further raise the implement E while it is being bodily raised as aforesaid.

The other lifting method possible with the apparatus hereof is employed when the teeth of the rooting implement E are caught or encounters it is apparent they may become caught under or encounter a root, boulder, hard crust or the like, or when the teeth are positioned in such a manner in the ground that to lift them under the first described method would require the lifting out of the root or obstruction, or necessitate the lifting of the body of earth overlying said teeth. Accordingly the first step in this method of operation requires the pulling of cable 44 to open the valves 41 and 42 of the hydraulic link F, so that said link becomes a lost-motion connection. When these valves are opened, and the forward progress of the rooter continues, the teeth of the implement E react, so that said implement and the frame section D will swing upwardly and rearwardly on the hinge C and thereby move the teeth away from said obstruction and partly if not wholly out of the ground as seen in Fig. 4, without having to lift up on the obstruction or the body of earth overlying the teeth. As the implement thus moves automatically into partially elevated position, the piston 37 moves freely forwardly in the cylinder 36 which latter, though then free to swing on its pivotal connection 36' does not move bodily, as the lever 5 is then immovable. The valves 41 and 42 are held open during this operation and therefore the oil in the cylinder passes freely through the by-pass 40 to allow for said free movement of piston 37. During this operation the valves 23 and 24 of the device G are closed and therefore the piston 19, rod 18, and crank arm 5 are immovable. However when the implement is raised as aforesaid, the operator may now raise the entire frame and the implement bodily, by opening the valves 23 and 24 of the device G and actuating the hook arms 8 to engage the pins 9 on the wheels, whereby to lift the crank axle 2 and frame A as previously described. Before thus lifting the frame and implement bodily, the operator releases cable 44 and allows the valves 23 and 24 to close whereby to lock the piston 19 against movement and thereby hold the implement in the raised position to which it is moved by reaction to the ground during forward travel of the apparatus. In this connection it should be noted that after opening the valves 41 and 42 as aforesaid to allow the retro-grade or other movement of the implement as aforesaid, the operator may at will lock the implement in any position in which it may move or is moved, by merely releasing the cable 44 and allowing the valves 41 and 42 to close and trap the fluid on opposite sides of the piston 19.

It is now seen that it is unnecessary to stop or back up the apparatus to free the teeth of the implement from an obstruction or to avoid an obstruction or the lifting of the earth or obstruction which may overlie said teeth.

It is important to note that the device G affords complete control of the gravitational return movement of the operating mechanism and frame for disposing the teeth of the implement in any operative or rooting position. When it is desired to lower the implement into an operative position either to uproot a stump or to dislodge a boulder or move obstructions etc. which are in or above the ground, the operator pulls on the cable 35 and opens the valves 23 and 24 of the device G. The piston 19 is now free to move rearwardly and therefore the frame A and implement will commence to gravitate. As the piston 19 moves in this manner the fluid between it and the rear end of the cylinder 17 will be forced through the port 21 and by-pass 20 to the other end of the cylinder. Due to the relatively small passage afforded the fluid thus by-passed, the movement of the frame A, implement E, and associated parts, will be under this hydraulic control and comparatively slow and of course subject to being stopped at will by the operator releasing cable 35 and allowing valves 23 and 24 to close. In this manner a hydraulically controlled movement of the implement E is effected and damage of the teeth due to forcibly striking hard ground is therefore eliminated. Moreover this hydraulically controlled movement provides as will be readily apparent, for regulating the depth of penetration of the teeth of said implement.

Should it be desired to change the angle and position of the teeth of the implement when in rooting position, the operator may pull cable 44 and open valves 41 and 42 then back up the tractor until the implement moves on its hinge C to the desired position at which time the operator releases said cable and allows said valves to close and thereby lock the implement in adjusted position. Inasmuch as the device G affords a setting of the implement at any position between its fully raised and maximum ground rooting positions, the implement may be set as desired for pulling stumps, or moving or dislodging any above the ground object. In some instances the position and angle of the teeth should be changed to best effect the operation of the implement, and this angle or position change of the implement may be effected by opening valves 41 and 42 and allowing the frame section D and implement thereon to gravitate as desired, then closing said valves, or a change may be effected by retrograde or other movement as occasioned by engagement of the implement with the object to be moved, during forward or backward movement of the apparatus, and of course with said valves held open until the desired position or angle is attained, and then closed.

It is important to note that the hydraulic means hereof is operable for holding the implement against gravitational or other movement when said implement is raised to a predetermined elevation, and thereafter is initially operable at will for releasing said implement for movement under the hydraulic resistance or control of such means, into and out of ground engaging or any position between limits of movement thereof, and subsequently operable at will to stop and hold said implement in any position between limits of its movement. These provisions manifestly afford a more positive and efficient control and operation of the rooter and are particularly advantageous when considering the fact that such control and operation is entirely effected from the tractor.

As seen in Fig. 5 the by-pass pipes of the hydraulic devices F and G, it being noted that said devices are substantially identical as to construction, are provided with filling openings closed by plugs P and which afford the filling thereof and replenishment of fluid as by connection with a suitably valved reservoir or otherwise.

It is manifest that the operating means hereof either in whole or in part is suitable for use in various ways and in connection with various earth working apparatus, such as plows, subsoilers, beet pullers, disc-harrows, land levelers, and the like and therefore, it is to be understood that the mechanism hereof as claimed may be used as above stated and in any other manner as within the purview of this invention.

Having described my invention I claim as new and ask for Letters Patent:

1. In ground working apparatus, a frame, a ground working implement associated with the frame for up and down movement, means associated with said frame and implement for raising said implement; hydraulic means operable for retaining said implement in elevated position and thereafter operable at will for releasing said implement for movement under hydraulic control into ground engaging, or any position between limits of movement thereof, and subsequently operable at will for holding said implement in any position which it may have reached between limits of its movement, and a lost motion connection affording movement of the implement relative to the raising means therefor.

2. In ground working apparatus, a frame, a ground working implement associated with said frame for movement upwardly to a position from which it may gravitate, means associated with said frame for elevating said implement to a position from which it will gravitate if not held, hydraulic means operable for holding said implement against gravitational movement from an elevated position, and thereafter operable for releasing said implement for gravitational movement, and next operable at will for holding said implement against movement out of any position into which it may have reached when released, and a lost motion connection affording movement of the implement relative to the raising means therefor.

3. In ground working apparatus, a frame, a wheeled support therefore, a ground working implement associated with said frame for movement upwardly into a position from which it may gravitate, means actuated by rotation of the wheels of said support for elevating said implement to a position from which it will gravitate if not held, hydraulic means operable for holding said implement against gravitational movement from an elevated position, and thereafter operable for releasing said implement and next operable at will for holding said implement against movement, and a lost motion connection affording movement of the implement relative to the raising means therefor.

4. In ground working apparatus, a frame, a ground working implement associated with the frame for up and down movement, means associated with said frame and implement for raising said implement; and hydraulic means operable for retaining said implement in elevated position and thereafter operable at will for releasing said implement for movement under hydraulic control into ground engaging, or any position between limits of movement thereof, and subsequently operable at will for holding said implement in any position which it may have reached between limits of its movement, and another hydraulic means for controlling said movement of said implement.

5. In ground working apparatus, a frame, a ground working implement associated with the frame for up and down movement, means associated with said frame and implement for raising said implement; and hydraulic means operable for retaining said implement in elevated position and thereafter operable at will for releasing said implement for movement under hydraulic control into ground engaging or any position between limits of movement thereof, and subsequently operable at will for holding said implement in any position which it may have reached between limits of its movement, and another hydraulic means operable independently of said first hydraulic means for controlling said movement of said implement.

6. In ground working apparatus, a frame, a ground working implement associated with the frame for up and down movement, means associated with said frame and implement for raising said implement; and hydraulic means operable for retaining said implement in elevated position and thereafter operable at will for releasing said implement for movement under hydraulic control into ground engaging or any position between limits of movement thereof, and subsequently operable at will for holding said implement in any position which it may have reached between limits of its movement, and another hydraulic means operable simultaneously with or independently of said first hydraulic means for controlling movement of said implement.

7. In ground working apparatus, a frame, a wheeled support therefore, a ground working implement associated with said frame for movement upwardly into a position from which it may gravitate, means actuated by rotation of the wheels of said support for elevating said implement to a position from which it will gravitate if not held, and hydraulic means operable for holding said implement against gravitational movement from an elevated position, and thereafter operable for releasing said implement and next operable at will for holding said implement against movement, including a crank arm associated with the implement and said wheel operated means and moving responsive to the movement of said wheel-operated means, a piston rod pivoted to said crank arm, a piston fixed to said rod, a cylinder in which said piston is movable, means for by-passing fluid in said cylinder around said piston from one end of the cylinder to the other, and valve means controlling said by-pass means to hydraulically hold or release said piston.

8. In ground working apparatus, a frame, a wheeled support therefore, a ground working implement associated with said frame for movement upwardly into a position from which it may gravitate, means actuated by rotation of the wheels of said support for elevating said implement to a position from which it will gravitate if not held, hydraulic means operable for holding said implement against gravitational movement from an elevated position, and thereafter operable for releasing said implement and next operable at will for holding said implement against movement, including a crank arm associated with the frame, the implement, and said wheel operated means and moving responsive to the movement of said wheel-operated means, a piston rod pivoted to said crank arm, a piston fixed to said crank arm, a piston fixed to said rod, a cylinder in which said piston is movable, means for by-passing fluid in said cylinder to opposite ends of the piston, and valve means controlling said by-pass means to hydraulically hold or release said piston, and means associated with said frame, implement, and implement raising means for raising frame upon actuation of said implement raising means.

9. In ground working apparatus, a frame, a wheeled support therefore, a ground working implement associated with said frame for movement upwardly into a position from which it may gravitate, means actuated by rotation of the wheels of said support for elevating said implement to a position from which it will gravitate if not held, hydraulic means operable for holding said implement against gravitational movement from an elevated position, and thereafter operable for releasing said implement and next operable at will for holding said implement against movement, including a crank arm associated with implement and said wheel operated means and moving responsive to the movement of said implement, a piston rod pivoted to said crank arm, a piston fixed to said rod, a cylinder in which said piston is movable, means for by-passing fluid in said cylinder to opposite ends of the cylinder, valve means controlling said by-pass means to hydraulically hold or release said piston, means associated with said frame, implement and implement raising means for raising frame upon actuation of said implement raising means, means hingedly supporting said implement on said frame, and another hydraulic device serving as a link between the crank arm and said implement and operable for controlling movement of said implement independent of operation of a raising operation of said implement raising means.

10. In ground working apparatus, a frame, a wheeled support on which said frame may be raised and lowered, means actuated by the rotation of the wheels of said support for raising the frame to a position from which it may gravitate, hydraulic means operable for holding the frame in raised position and thereafter operable for releasing said frame for gravitational movement, and subsequently operable for holding the frame against movement out of position to which it is permitted to gravitate or move after being released, a ground working implement, and means connecting said implement with said frame for movement with and relative to said frame.

11. In ground working apparatus, a frame, a wheeled support on which said frame may be raised and lowered, means actuated by the rotation of the wheels of said support for raising the frame to a position from which it may gravitate, hydraulic means operable for holding the frame in raised position and thereafter operable for releasing said frame for gravitational movement, and subsequently operable for holding the frame against movement out of position to which it is permitted to gravitate or move after being released, a ground working implement, and means connecting said implement with said frame for movement with and relative to said frame including a hydraulic link operatively connecting said implement and said hydraulic means and selectively operable as a lost-motion device for affording movement of the implement while the frame is held against movement, and as a rigid link for moving the implement relative to the frame while the latter is being raised or lowered and for holding the implement against movement relative to the frame when the latter is held by said hydraulic means.

12. In ground working apparatus, a frame, a ground working implement hingedly connected with said frame, means affording the bodily raising and lowering of said frame and implement, and hydraulic mechanism operatively connected with said frame, said means and said implement and being selectively operable for holding the implement against movement relative to the frame while the frame is stationary, and for releasing said implement for movement relative to the frame while the frame is stationary or is being raised or lowered.

13. In ground working apparatus, a frame, a wheeled support on which said frame is movable towards and away from the ground, an implement hinged to said frame for movement relative thereto and bodily therewith, means for raising said frame bodily and thereby also raising the implement, a hydraulic means associated with the frame and said raising means and operable at will for releasably holding said frame against movement out of elevated position and another hydraulic means associated with the implement and said raising means and selectively operable to serve as a link for moving the implement on its hinge while the frame is bodily raised and lowered, and as a lost-motion connection affording movement of the implement relative to frame while the latter is held against movement.

14. In ground working apparatus, a crank-axle, wheels mounted for rotation on the crank-axle, a frame supported by said crank axle, means actuated by rotation of the wheels for moving said axle to raise the frame to a predetermined elevation, a crank arm associated with said axle for movement during raising of the frame, a ground working implement hinged to said frame, a link between said crank arm and said implement for swinging the implement upwardly on its hinge connection when the frame is raised, and a hydraulic device connected with said frame and said crank arm and operable for holding the frame in elevated position and thereafter operable for releasing said frame and subsequently operable at will for stopping movement of said frame and holding the same and the implement in position to which they may have been moved following said release of said frame.

15. In a ground working implement, a wheeled support, a frame thereon, means actuated by said support and through rotation of wheels for raising said frame relative to the ground, a ground working implement hinged to the frame, means for releasably holding the frame in an elevated position from which said frame will gravitate when released, and a hydraulic link operatively connected with said implement and said frame raising means and selectively operable to serve as an operating link or lost-motion connection between said raising means and said implement.

16. In ground working implement, a wheeled support, a frame thereon, means actuated by said support and through rotation of wheels for raising said frame relative to the ground, a ground working implement hinged to the frame, means for releasably holding the frame in an elevated position from which said frame will gravitate when released, and a hydraulic link operatively connected with said implement and said frame raising means and selectively operable to serve as an operating link of lost-motion connection between said raising means and said implement, said last named means including a cylinder in operative connection with said raising means, a piston therein, a by-pass around the piston, a piston rod in operative connection with said implement, and valves for controlling movement of a hydraulic fluid in said cylinder and by-pass for releasably holding the piston against movement relative to said cylinder.

LEN. O. BIRD.